US007206551B2

(12) United States Patent
Itakura et al.

(10) Patent No.: US 7,206,551 B2
(45) Date of Patent: Apr. 17, 2007

(54) HIGH FREQUENCY SWITCH MODULE AND MULTI-LAYER SUBSTRATE FOR HIGH FREQUENCY SWITCH MODULE

(75) Inventors: Masami Itakura, Tokyo (JP); Tomoyuki Goi, Tokyo (JP); Takuya Adachi, Tokyo (JP)

(73) Assignee: TDK Corporation, Tokyo (JP)

( * ) Notice: Subject to any disclaimer, the term of this patent is extended or adjusted under 35 U.S.C. 154(b) by 433 days.

(21) Appl. No.: 10/912,244

(22) Filed: Aug. 6, 2004

(65) Prior Publication Data

US 2005/0032484 A1 Feb. 10, 2005

(30) Foreign Application Priority Data

Aug. 8, 2003 (JP) ............................ 2003-206632

(51) Int. Cl.
*H04B 1/44* (2006.01)
*H04B 1/46* (2006.01)
*H04B 7/00* (2006.01)

(52) U.S. Cl. ............................ 455/73; 455/78; 455/83; 455/140; 455/276.1

(58) Field of Classification Search ............... 455/63.3, 455/78–83, 132–140, 272–277.2
See application file for complete search history.

(56) References Cited

U.S. PATENT DOCUMENTS

| | | | | |
|---|---|---|---|---|
| 5,815,804 | A | 9/1998 | Reddy et al. | |
| 6,407,614 | B1 | 6/2002 | Takahashi | |
| 6,597,231 | B2 | 7/2003 | Tsutsumi | |
| 6,633,748 | B1 * | 10/2003 | Watanabe et al. | 455/78 |
| 6,658,237 | B1 * | 12/2003 | Rozenblit et al. | 455/83 |
| 6,704,550 | B1 | 3/2004 | Kohama et al. | |
| 6,795,714 | B1 * | 9/2004 | Fickenscher et al. | 455/552.1 |
| 6,861,924 | B2 * | 3/2005 | Machui | 333/133 |
| 6,912,406 | B2 * | 6/2005 | Lahlum et al. | 455/553.1 |
| 6,995,630 | B2 * | 2/2006 | Satoh et al. | 333/133 |
| 7,020,453 | B2 * | 3/2006 | Hidaka et al. | 455/333 |
| 7,027,778 | B2 * | 4/2006 | Ha et al. | 455/78 |
| 7,027,779 | B2 * | 4/2006 | Tai et al. | 455/83 |

(Continued)

FOREIGN PATENT DOCUMENTS

EP 0 993 063 A2 4/2000

(Continued)

*Primary Examiner*—Simon Nguyen
(74) *Attorney, Agent, or Firm*—Oliff & Berridge, PLC

(57) ABSTRACT

A high frequency switch module comprises an antenna port, a plurality of transmission signal ports, a plurality of reception signal ports, a high frequency switch, a plurality of LPFs and a plurality of phase adjusting lines. The high frequency switch allows one signal port among the transmission signal ports and the reception signal ports to be selectively connected to the antenna port. The high frequency switch includes a field-effect transistor made of a GaAs compound semiconductor. Each of the phase adjusting lines connects the high frequency switch to each of the LPFs. Each of the phase adjusting lines adjusts a phase difference between a progressive wave of a harmonic resulting from a transmission signal and produced at the high frequency switch and a reflected wave resulting from reflection of the progressive wave from each of the LPFs such that the power of a composite wave made up of the progressive wave and the reflected wave is made lower at the point of the high frequency switch.

14 Claims, 7 Drawing Sheets

U.S. PATENT DOCUMENTS

| | | | | |
|---|---|---|---|---|
| 7,057,472 | B2 * | 6/2006 | Fukamachi et al. | 333/101 |
| 7,092,676 | B2 * | 8/2006 | Abdelgany et al. | 455/76 |
| 7,130,655 | B2 * | 10/2006 | Kemmochi et al. | 455/552.1 |
| 2002/0090974 | A1 | 7/2002 | Hagn | |
| 2002/0158705 | A1 | 10/2002 | Iwasaki et al. | |
| 2002/0183016 | A1 * | 12/2002 | Kemmochi et al. | 455/83 |
| 2003/0022638 | A1 | 1/2003 | Imai et al. | |
| 2004/0266378 | A1 | 12/2004 | Fukamachi et al. | |

FOREIGN PATENT DOCUMENTS

| | | |
|---|---|---|
| EP | 1 085 667 A1 | 3/2001 |
| EP | 1 418 678 A2 | 5/2004 |
| JP | A 11-298201 | 10/1999 |
| JP | A 2001-86026 | 3/2001 |
| JP | A 2002-43911 | 2/2002 |
| JP | A 2002-176375 | 6/2002 |
| JP | A 2002-185356 | 6/2002 |
| JP | A 2002-232320 | 8/2002 |
| JP | A 2002-299922 | 10/2002 |
| JP | A 2003-46452 | 2/2003 |
| JP | A 2003-152588 | 5/2003 |

* cited by examiner

HIGH FREQUENCY SWITCH MODULE AND MULTI-LAYER SUBSTRATE FOR HIGH FREQUENCY SWITCH MODULE

BACKGROUND OF THE INVENTION

1. Field of the Invention

The present invention relates to a high frequency switch module used for switching frequency bands and switching between transmission signals and reception signals, for example, of a radio communications device such as a cellular phone, and to a multi-layer substrate used for such a high frequency switch module.

2. Description of the Related Art

Cellular phones operable in multiple frequency bands have been practically utilized. For example, cellular phones for the global system for mobile communications (GSM) started as phones operable in a single band of the extended GSM (EGSM), and has been converted to phones operable in dual bands of the EGSM and the digital cellular system (DCS), and to phones operable in triple bands of the EGSM, the DCS, and the personal communications service (PCS). The number of frequency bands in which a single cellular phone is operated is thereby increased to extend the speech channel.

Since the GSM uses a time division multiple access system, cellular phones for the GSM performs switching between transmission signals and reception signals, using high frequency switches. Many of such high frequency switches use PIN diodes as switch elements. Many of phones operable in triple bands incorporate high frequency switches with PIN diodes, too. A high frequency switch using a PIN diode is disclosed in the Published Unexamined Japanese Patent Application Heisei 11-298201 (1999).

Some cellular phones comprising high frequency switches incorporate field-effect transistors made of a GaAs compound semiconductor (hereinafter referred to as GaAs-FET) as switch elements of the high frequency switches. A high frequency switch using the GaAs-FET has advantages that the circuit is simpler, designing is easier, a reduction in size is possible, and power consumption is lower, compared to a high frequency switch using a PIN diode. The high frequency switches using the PIN diodes are used in many of cellular phones for the time division multiple access system except the GSM, such as the personal handyphone system (PHS) or the personal digital cellular (PDC) system. A high frequency switch using a GaAs-FET is disclosed in the Published Unexamined Japanese Patent Application 2002-43911.

The high frequency switches using PIN diodes have a problem that the circuit is made more complicated as the number of frequency bands to switch increases, and it takes a longer period of time to design and fabricate prototypes of high frequency switches having required characteristics. In particular, to make devices operable in the four bands of the EGSM, the American GSM (AGSM), the DCS and the PCS, or the five bands of the EGSM, the AGSM, the DCS, the PCS and the wideband code division multiple access (WCDMA), it is more difficult to design and reduce the dimensions of the high frequency switches using the PIN diodes. Moreover, if the number of frequency bands to switch increases, the high frequency switches using the PIN diodes have a problem that harmonics produced by a non-conducting PIN diode increase and a problem that a current for making the PIN diodes conducting increases, which affects the period of time for which the cellular phone is operable for speech.

On the other hand, the high frequency switch using the GaAs-FET has a problem that, when a transmission signal of large power passes through the switch, the nonlinear characteristic of the GaAs-FET causes distortion of the transmission signal which then causes harmonics of a frequency of ‘n’ times the frequency of the transmission signal, where ‘n’ is an integer equal to or greater than 2. For example, if a transmission signal of 35 dBm, the maximum value of power of a transmission signal according to the GSM standard, is supplied to the high frequency switch using the GaAs-FET, the high frequency switch produces harmonics. In some cases the magnitude of these harmonics exceed the permissible range according to the GSM standard. Cellular phones having such high frequency switches are not acceptable. Therefore, high frequency switches using GaAs-FETs are not popular among cellular phones for the GSM. As a result, a small number of high frequency switches with GaAs-FETs are used, and the yield of phones satisfying the standard is poor, which prevents a reduction in price. Consequently, the high frequency switches using GaAs-FETs have a smaller share in the market than the high frequency switches using PIN diodes.

The frequency of twice the frequency of a GSM transmission signal falls within the frequency band of DCS signals. It is therefore impossible to reject the harmonics of the frequency of twice the frequency of a GSM transmission signal by using a filter in a dual-band cellular phone operable in the GSM and DCS.

According to the GSM standard, it is required that the power of frequency components of harmonics at an antenna terminal be −32 dBm or smaller. In addition, according to the transmission standard of the GSM, it is required that the maximum power of a transmission signal at the antenna terminal be 33 to 35 dBm. Therefore, a transmission signal of about 34 dBm is typically applied to the input of a high frequency switch. Moreover, it is required that the supply voltage for operating the high frequency switch be around 2.7 volts which is the operating voltage of the cellular phone. It is desired to implement a high frequency switch of multi-branch type such as a single-pole four-throw switch, using GaAs-FETs, that satisfies the above-described requirements and is inexpensive. However, according to the high frequency switch using the GaAs-FET, harmonic components increase if the operational voltage is reduced, so that it is difficult to provide the high frequency switches using GaAs-FETs with good yields. To satisfy the above-described characteristics only by the high frequency switch using the GaAs-FETs, it is required to improve the characteristics, which needs control of the manufacturing process of the FETs, such as adjustment of pinch-off voltage of the FETs, or adjustment of the bias point of the FETs which causes distortion of waveform when a high-power input is received. It is therefore extremely difficult to satisfy the above-described characteristics only by improving the high frequency switches using the GaAs-FETs.

OBJECT AND SUMMARY OF THE INVENTION

It is an object of the invention to provide a high frequency switch module that has a simple configuration and that is easy to design and capable of suppressing the power of frequency components of harmonics, and to provide a multi-layer substrate used for the high frequency switch module.

Each of first and second high frequency switch modules of the invention comprises: an antenna port connected to an antenna; a plurality of transmission signal ports for receiving transmission signals at each of a plurality of frequency bands; a plurality of reception signal ports for outputting reception signals at each of a plurality of frequency bands; a high frequency switch including a semiconductor switch element and selectively connecting one signal port among the transmission signal ports and the reception signal ports to the antenna port; a plurality of low-pass filters each provided between the high frequency switch and each of the transmission signal ports and allowing a transmission signal inputted to each of the transmission signal ports to pass therethrough and intercepting a harmonic resulting from the transmission signal; and a plurality of phase adjusting lines for connecting the high frequency switch to the respective low-pass filters.

According to the first high frequency switch module of the invention, each of the phase adjusting lines adjusts a phase difference between a progressive wave of a harmonic of at least one frequency resulting from the transmission signal and produced at the high frequency switch and a reflected wave resulting from reflection of the progressive wave from one of the low-pass filters such that, at a point of the high frequency switch, a composite wave made up of the progressive wave and the reflected wave has power lower by at least 10 dB as compared to a case where the phase difference between the progressive wave and the reflected wave is zero.

According to the first high frequency switch module of the invention, the phase adjusting lines adjust the phase difference between the progressive wave of the harmonic and the reflected wave, so as to suppress the power of frequency components of the harmonics traveling from the high frequency switch toward the antenna port.

According to the first high frequency switch module of the invention, each of the phase adjusting lines may adjust, with regard to a second harmonic, a phase difference between the progressive wave and the reflected wave such that the composite wave has power lower by at least 10 dB as compared to the case where the phase difference between the progressive wave and the reflected wave is zero, and may adjust, with regard to a third harmonic, a phase difference between the progressive wave and the reflected wave such that the composite wave has power lower by at least 3 dB as compared to the case where the phase difference between the progressive wave and the reflected wave is zero.

According to the first high frequency switch module of the invention, each of the phase adjusting lines may adjust, with regard to the second harmonic, the phase difference between the progressive wave and the reflected wave such that the composite wave has power lower by at least 15 dB as compared to the case where the phase difference between the progressive wave and the reflected wave is zero, and may adjust, with regard to the third harmonic, the phase difference between the progressive wave and the reflected wave such that the composite wave has power lower by at least 5 dB as compared to the case where the phase difference between the progressive wave and the reflected wave is zero.

According to the second high frequency switch module of the invention, each of the phase adjusting lines adjusts a phase difference between a progressive wave of a harmonic of at least one frequency resulting from the transmission signal and produced at the high frequency switch and a reflected wave resulting from reflection of the progressive wave from one of the low-pass filters such that the phase difference falls within a range of 160 to 200 degrees inclusive at a point of the high frequency switch.

According to the second high frequency switch module of the invention, the phase adjusting lines adjust the phase difference between the progressive wave of the harmonic and the reflected wave, so as to suppress the power of frequency components of the harmonics traveling from the high frequency switch toward the antenna port.

According to the second high frequency switch module of the invention, each of the phase adjusting lines may adjust, with regard to the second harmonic, the phase difference between the progressive wave and the reflected wave such that the phase difference falls within a range of 160 to 200 degrees inclusive, and may adjust, with regard to the third harmonic, the phase difference between the progressive wave and the reflected wave such that the phase difference falls within a range of 150 to 210 degrees inclusive.

According to the second high frequency switch module of the invention, each of the phase adjusting lines may adjust, with regard to the second harmonic, the phase difference between the progressive wave and the reflected wave such that the phase difference falls within a range of 170 to 190 degrees inclusive, and may adjust, with regard to the third harmonic, the phase difference between the progressive wave and the reflected wave such that the phase difference falls within a range of 165 to 195 degrees inclusive.

According to the first or second high frequency switch module of the invention, each of the phase adjusting lines may include a distributed constant line.

According to the first or second high frequency switch module of the invention, the high frequency switch may include a transistor as the semiconductor switch element. In this case, the transistor may be a field-effect transistor made of a GaAs compound semiconductor.

A multi-layer substrate for a high frequency switch module of the invention is a multi-layer substrate used for the first or second high frequency switch module of the invention. The multi-layer substrate includes the antenna port, the transmission signal ports, the reception signal ports, the low-pass filters and the phase adjusting lines, and is used to complete the high frequency switch module by mounting the high frequency switch thereon.

Other and further objects, features and advantages of the invention will appear more fully from the following description.

DESCRIPTION OF PREFERRED EMBODIMENT

Figure 1:
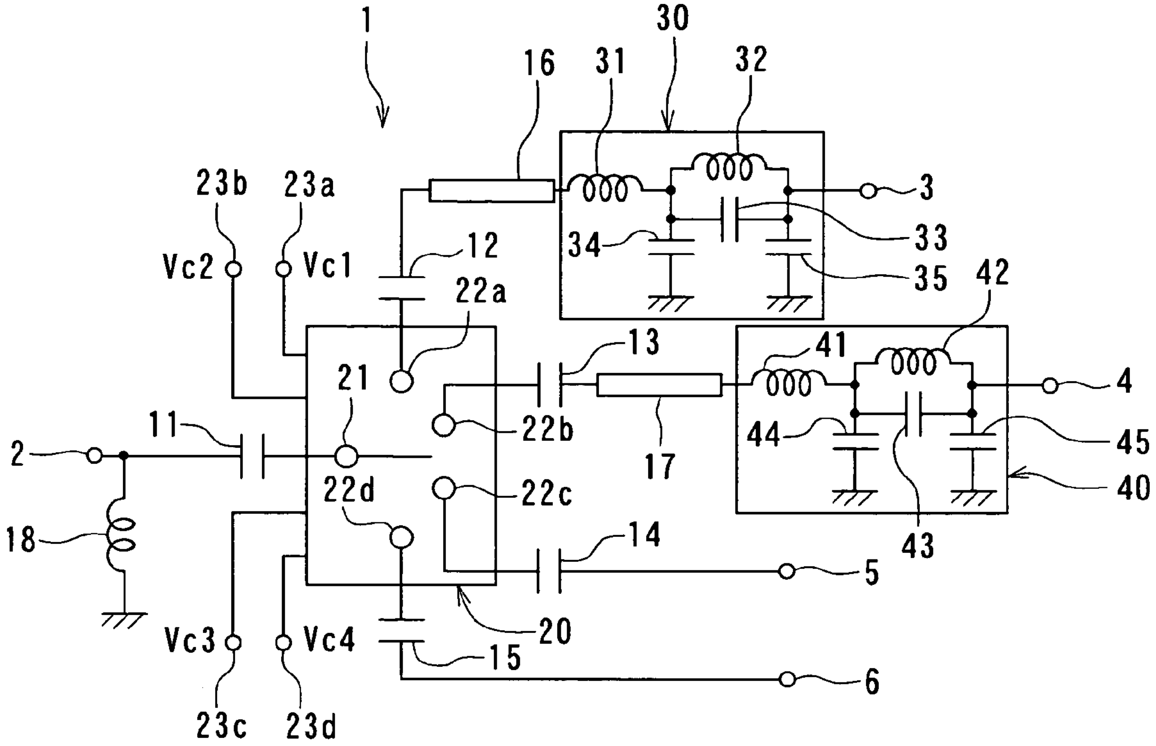
FIG. 1 is a schematic diagram illustrating an example of the circuit configuration of a high frequency switch module an embodiment of the invention.

A preferred embodiment of the invention will now be described in detail with reference to the accompanying drawings. Reference is now made to FIG. 1 to describe an example of the circuit configuration of a high frequency switch module of the embodiment of the invention. In the embodiment the high frequency switch module 1 for processing GSM transmission signals and reception signals and processing DCS transmission signals and reception signals will be described by way of example.

The frequency band of GSM transmission signals is 880 to 915 MHz. The frequency band of GSM reception signals is 925 to 960 MHz. The frequency band of DCS transmission signals is 1710 to 1785 MHz. The frequency band of DCS reception signals is 1805 to 1880 MHz.

The high frequency switch module 1 comprises: an antenna port 2 connected to an antenna not shown; transmission signal ports 3 and 4; reception signal ports 5 and 6; a high frequency switch 20; and two low-pass filters (hereinafter called LPFs) 30 and 40. The high frequency switch module 1 further comprises capacitors 11 to 15, phase adjusting lines 16 and 17, and an inductor 18.

The transmission signal ports 3 and 4 receive GSM transmission signals and DCS transmission signals, respectively. The reception signal ports 5 and 6 output GSM reception signals and DCS reception signals, respectively. The high frequency switch 20 allows one signal port among the transmission signal ports 3, 4 and the reception signal ports 5, 6 to be selectively connected to the antenna port 2.

The high frequency switch 20 has a single electronic transfer contact 21, four contacts 22*a*, 22*b*, 22*c* and 22*d*, and four control terminals 23*a*, 23*b*, 23*c* and 23*d*. The control terminals 23*a* to 23*d* are designed to receive control signals Vc1 to Vc4, respectively. When the control signal Vc1 is high and the other control signals Vc2 to Vc4 are low, the electronic transfer contact 21 is connected to the contact 22*a*. When the control signal Vc2 is high and the other control signals Vc1, Vc3 and Vc4 are low, the electronic transfer contact 21 is connected to the contact 22*b*. When the control signal Vc3 is high and the other control signals Vc1, Vc2 and Vc4 are low, the electronic transfer contact 21 is connected to the contact 22*c*. When the control signal Vc4 is high and the other control signals Vc1 to Vc3 are low, the electronic transfer contact 21 is connected to the contact 22*d*.

The electronic transfer contact 21 is connected to the antenna port 2 through the capacitor 11. The inductor 18 has an end connected to the antenna port 2 and the other end grounded. The capacitor 12 has an end connected to the contact 22*a* and the other end connected to an end of the phase adjusting line 16. The other end of the phase adjusting line 16 is connected to an output of the LPF 30. An input of the LPF 30 is connected to the transmission signal port 3. The capacitor 13 has an end connected to the contact 22*b* and the other end connected to an end of the phase adjusting line 17. The other end of the phase adjusting line 17 is connected to an output of the LPF 40. An input of the LPF 40 is connected to the transmission signal port 4. The capacitor 14 has an end connected to the contact 22*c* and the other end connected to the reception signal port 5. The capacitor 15 has an end connected to the contact 22*d* and the other end connected to the reception signal port 6.

The LPF 30 has: an inductor 31 having an end connected to the output; an inductor 32 having an end connected to the other end of the inductor 31 and the other end connected to the input; a capacitor 33 having an end connected to the other end of the inductor 31 and the other end connected to the input; a capacitor 34 having an end connected to the other end of the inductor 31 and the other end grounded; and a capacitor 35 having an end connected to the input and the other end grounded. The LPF 30 allows a transmission signal received at the transmission signal port 3 to pass therethrough, and rejects harmonics resulting from this transmission signal.

The LPF 40 has: an inductor 41 having an end connected to the output; an inductor 42 having an end connected to the other end of the inductor 41 and the other end connected to the input; a capacitor 43 having an end connected to the other end of the inductor 41 and the other end connected to the input; a capacitor 44 having an end connected to the other end of the inductor 41 and the other end grounded; and a capacitor 45 having an end connected to the input and the other end grounded. The LPF 40 allows a transmission signal received at the transmission signal port 4 to pass therethrough, and rejects harmonics resulting from this transmission signal.

The phase adjusting lines 16 and 17 may include distributed constant lines. The phase adjusting lines 16 and 17 will be described in detail later.

The inductor 18 is used as a surge suppressing element. A surge resulting from electrostatic discharge, for example, from the antenna enters the high frequency switch module 1. The inductor 18 introduces the current resulting from the surge to the ground and thereby suppresses the surge. As a result, damage to the high frequency switch 20 is prevented.

Figure 2:
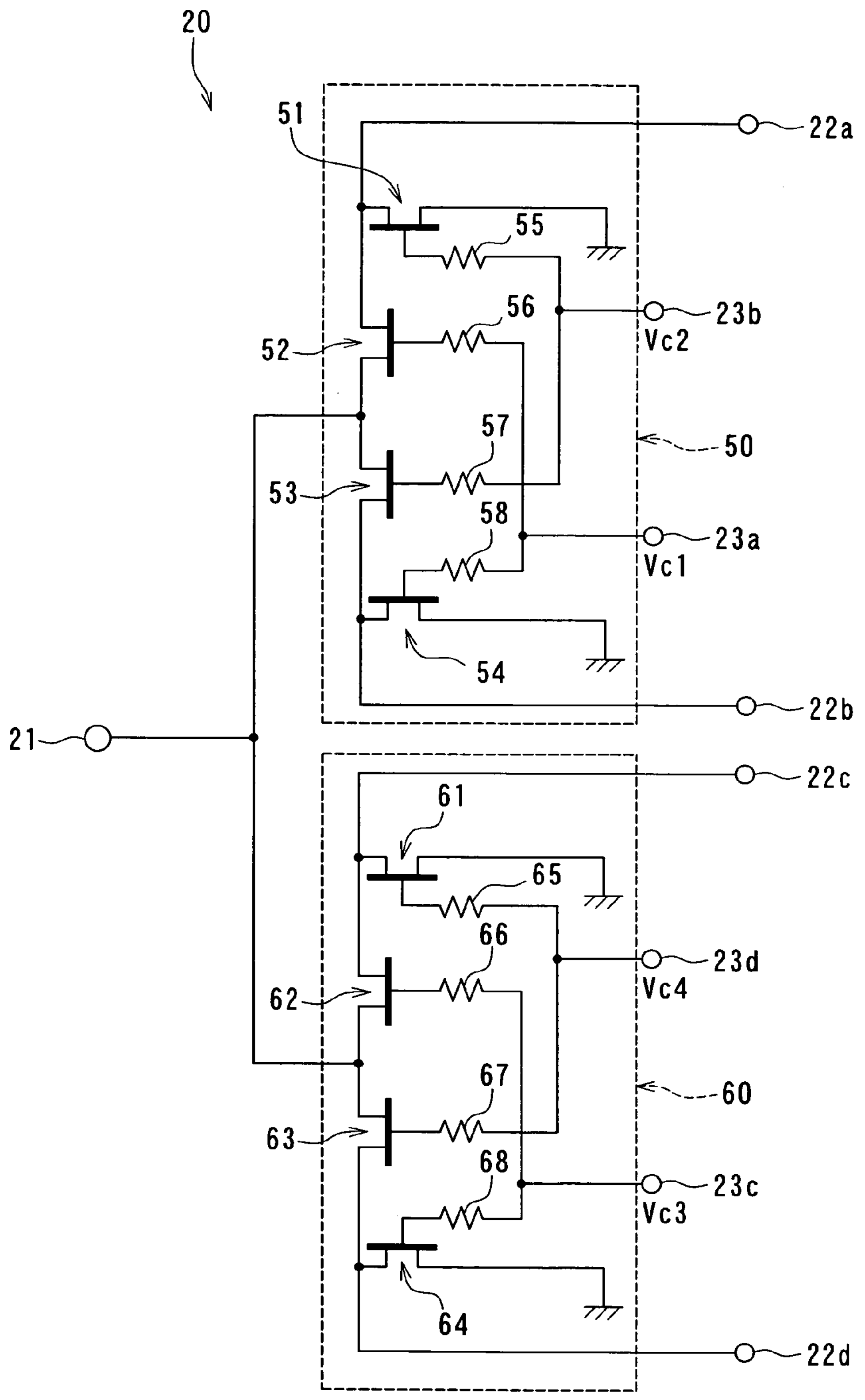
FIG. 2 is a schematic diagram illustrating an example of the configuration of the high frequency switch of FIG. 1.

Reference is now made to FIG. 2 to describe an example of the configuration of the high frequency switch 20 of the embodiment. The high frequency switch 20 of FIG. 2 comprises the single electronic transfer contact 21, the four contacts 22*a*, 22*b*, 22*c* and 22*d*, the four control terminals 23*a*, 23*b*, 23*c* and 23*d*, and two switch sections 50 and 60. Each of the switch sections 50 and 60 includes four transistors as semiconductor switch elements, and forms a single-pole, double-throw switch. Therefore, the high frequency switch 20 as a whole forms a single-pole, four-throw switch.

The switch section 50 includes four GaAs-FETs 51 to 54 as transistors. The FET 51 has a drain connected to the terminal 22*a*, a source grounded, and a gate connected to the control terminal 23*b* through a resistor 55. The FET 52 has a drain connected to the terminal 22*a*, a source connected to the electronic transfer contact 21, and a gate connected to the control terminal 23*a* through a resistor 56. The FET 53 has a drain connected to the terminal 22*b*, a source connected to the electronic transfer contact 21, and a gate connected to the control terminal 23*b* through a resistor 57. The FET 54 has a drain connected to the terminal 22*b*, a source grounded, and a gate connected to the control terminal 23*a* through a resistor 58.

The switch section 60 includes four GaAs-FETs 61 to 64 as transistors. The FET 61 has a drain connected to the terminal 22*c*, a source grounded, and a gate connected to the control terminal 23*d* through a resistor 65. The FET 62 has a drain connected to the electronic transfer contact 21, a source connected to the terminal 22*c*, and a gate connected to the control terminal 23*c* through a resistor 66. The FET 63 has a drain connected to the electronic transfer contact 21, a source connected to the terminal 22*d*, and a gate connected to the control terminal 23*d* through a resistor 67. The FET 64 has a drain connected to the terminal 22*d*, a source grounded, and a gate connected to the control terminal 23*c* through a resistor 68.

The operations of the high frequency switch 20 and the high frequency switch module 1 will now be described. The control terminals 23*a* to 23*d* of the high frequency switch 20 are designed to receive control signals Vc1 to Vc4, respectively. When the control signal Vc1 is high and the other control signals Vc2 to Vc4 are low, the FETs 52 and 54 are conducting and the other FETs are nonconducting. As a result, the electronic transfer contact 21 is connected to the contact 22*a*. In this state, it is the transmission signal port 3 that is connected to the antenna port 2. A GSM transmission signal inputted to the transmission signal port 3 is sent out to the antenna port 2 through the LPF 30, the phase adjusting line 16, the capacitor 12, the high frequency switch 20 and the capacitor 11.

When the control signal Vc2 is high and the other control signals Vc1, Vc3 and Vc4 are low, the FETs 51 and 53 are conducting and the other FETs are nonconducting. As a result, the electronic transfer contact 21 is connected to the contact 22*b*. In this state, it is the transmission signal port 4 that is connected to the antenna port 2. A DCS transmission signal inputted to the transmission signal port 4 is sent out to the antenna port 2 through the LPF 40, the phase adjusting line 17, the capacitor 13, the high frequency switch 20 and the capacitor 11.

When the control signal Vc3 is high and the other control signals Vc1, Vc2 and Vc4 are low, the FETs 62 and 64 are conducting and the other FETs are nonconducting. As a result, the electronic transfer contact 21 is connected to the contact 22*c*. In this state, it is the reception signal port 5 that is connected to the antenna port 2. A GSM reception signal inputted to the antenna port 2 is sent out to the reception signal port 5 through the capacitor 11, the high frequency switch 20 and the capacitor 14.

When the control signal Vc4 is high and the other control signals Vc1 to Vc3 are low, the FETs 61 and 63 are conducting and the other FETs are nonconducting. As a result, the electronic transfer contact 21 is connected to the contact 22*d*. In this state, it is the reception signal port 6 that is connected to the antenna port 2. A DCS reception signal inputted to the antenna port 2 is sent out to the reception signal port 6 through the capacitor 11, the high frequency switch 20 and the capacitor 15.

The phase adjusting line 16 will now be described. When the electronic transfer contact 21 is connected to the contact 22*a* in the high frequency switch 20, a GSM transmission signal inputted to the transmission signal port 3 passes through the high frequency switch 20. At this time, the nonlinear characteristic of the high frequency switch 20 causes distortion of the transmission signal which creates a harmonic having a frequency of 'n' times the frequency of the transmission signal, where 'n' is an integer equal to or greater than 2. This harmonic becomes a progressive wave and heads for the antenna port 2 and the LPF 30. To allow the transmission signal to pass and to reject harmonics, the LPF 30 is designed such that the impedance is high at frequencies higher than the frequency of the transmission signal and particularly at frequencies twice and three times the frequency of the transmission signal. Consequently, the progressive wave of the harmonic generated at the high frequency switch 20 is nearly fully reflected off the LPF 30 and returns to the high frequency switch 20 as a reflected wave. As a result, a composite wave made up of the progressive wave of the harmonic and the reflected wave is generated at the high frequency switch 20, and the composite wave heads for the antenna port 2. Here, if the phase difference between the progressive wave and the reflected wave is zero at the point of the high frequency switch 20, the power of the composite wave is the greatest.

The phase adjusting line 16 adjusts the phase difference between the progressive wave of a harmonic of at least one frequency resulting from a GSM transmission signal and produced at the high frequency switch 20 and the reflected wave resulting from reflection of the progressive wave from the LPF 30 such that, at the point of the high frequency switch 20, the composite wave made up of the progressive wave and the reflected wave has power lower by at least 10 dB as compared to the case where the phase difference between the progressive wave and the reflected wave is zero. It is thereby possible that the power of the composite wave heading for the antenna port 2 is made lower by at least 10 dB as compared to the case where the phase difference between the progressive wave and the reflected wave is zero.

It is preferred that the phase adjusting line 16 adjusts, with regard to a second harmonic of a frequency twice the frequency of a GSM transmission signal, the phase difference between the progressive wave and the reflected wave such that the composite wave has power lower by at least 10 dB as compared to the case where the phase difference between the progressive wave and the reflected wave is zero, and adjusts, with regard to a third harmonic of a frequency three times the frequency of a GSM transmission signal, the phase difference between the progressive wave and the reflected wave such that the composite wave has power lower by at least 3 dB as compared to the case where the phase difference between the progressive wave and the reflected wave is zero.

It is more preferred that the phase adjusting line 16 adjusts, with regard to the second harmonic of a frequency twice the frequency of a GSM transmission signal, the phase difference between the progressive wave and the reflected wave such that the composite wave has power lower by at least 15 dB as compared to the case where the phase difference between the progressive wave and the reflected wave is zero, and adjusts, with regard to the third harmonic of a frequency three times the frequency of a GSM transmission signal, the phase difference between the progressive wave and the reflected wave such that the composite wave has power lower by at least 5 dB as compared to the case where the phase difference between the progressive wave and the reflected wave is zero.

The phase adjusting line 16 may adjust the phase difference between the progressive wave of a harmonic of at least one frequency resulting from a GSM transmission signal and produced at the high frequency switch 20 and the reflected wave resulting from reflection of the progressive wave from the LPF 30 such that the phase difference falls within a range of 160 to 200 degrees inclusive at the point of the high frequency switch 20.

It is preferred that the phase adjusting line 16 adjusts, with regard to the second harmonic of a frequency twice the frequency of a GSM transmission signal, the phase difference between the progressive wave and the reflected wave such that the phase difference falls within a range of 160 to 200 degrees inclusive, and adjusts, with regard to the third harmonic of a frequency three times the frequency of a GSM transmission signal, the phase difference between the progressive wave and the reflected wave such that the phase difference falls within a range of 150 to 210 degrees inclusive.

It is more preferred that the phase adjusting line 16 adjusts, with regard to the second harmonic of a frequency twice the frequency of a GSM transmission signal, the phase difference between the progressive wave and the reflected wave such that the phase difference falls within a range of 170 to 190 degrees inclusive, and adjusts, with regard to the third harmonic of a frequency three times the frequency of a GSM transmission signal, the phase difference between the progressive wave and the reflected wave such that the phase difference falls within a range of 165 to 195 degrees inclusive.

The phase adjusting line 17 will now be described. When the electronic transfer contact 21 is connected to the contact 22*b* in the high frequency switch 20, a DCS transmission signal inputted to the transmission signal port 4 passes through the high frequency switch 20, wherein a harmonic having a frequency of 'n' times the frequency of the transmission signal is produced, where 'n' is an integer equal to or greater than 2. This harmonic becomes a progressive wave which heads for the antenna port 2 and the LPF 40. To allow the transmission signal to pass and to reject harmonics, the LPF 40 is designed such that the impedance is high at frequencies higher than the frequency of the transmission signal and particularly at frequencies twice and three times the frequency of the transmission signal. Consequently, the progressive wave of the harmonic generated at the high frequency switch 20 is nearly fully reflected off the LPF 40 and returns to the high frequency switch 20 as a reflected wave. As a result, a composite wave made up of the progressive wave of the harmonic and the reflected wave is generated at the high frequency switch 20, and the composite wave heads for the antenna port 2. Here, if the phase difference between the progressive wave and the reflected wave is zero at the point of the high frequency switch 20, the power of the composite wave is the greatest.

The phase adjusting line 17 adjusts the phase difference between the progressive wave of a harmonic of at least one frequency resulting from a DCS transmission signal and produced at the high frequency switch 20 and the reflected wave resulting from reflection of the progressive wave from the LPF 40 such that, at the point of the high frequency switch 20, the composite wave made up of the progressive wave and the reflected wave has power lower by at least 10 dB as compared to the case where the phase difference between the progressive wave and the reflected wave is zero. It is thereby possible that the power of the composite wave heading for the antenna port 2 is made lower by at least 10 dB as compared to the case where the phase difference between the progressive wave and the reflected wave is zero.

It is preferred that the phase adjusting line 17 adjusts, with regard to the second harmonic of a frequency twice the frequency of a DCS transmission signal, the phase difference between the progressive wave and the reflected wave such that the composite wave has power lower by at least 10 dB as compared to the case where the phase difference between the progressive wave and the reflected wave is zero, and adjusts, with regard to the third harmonic of a frequency three times the frequency of a DCS transmission signal, the phase difference between the progressive wave and the reflected wave such that the composite wave has power lower by at least 3 dB as compared to the case where the phase difference between the progressive wave and the reflected wave is zero.

It is more preferred that the phase adjusting line 17 adjusts, with regard to the second harmonic of a frequency twice the frequency of a DCS transmission signal, the phase difference between the progressive wave and the reflected wave such that the composite wave has power lower by at least 15 dB as compared to the case where the phase difference between the progressive wave and the reflected wave is zero, and adjusts, with regard to the third harmonic of a frequency three times the frequency of a DCS transmission signal, the phase difference between the progressive wave and the reflected wave such that the composite wave has power lower by at least 5 dB as compared to the case where the phase difference between the progressive wave and the reflected wave is zero.

The phase adjusting line 17 may adjust the phase difference between the progressive wave of a harmonic of at least one frequency resulting from a DCS transmission signal and produced at the high frequency switch 20 and the reflected wave resulting from reflection of the progressive wave from the LPF 40 such that the phase difference falls within a range of 160 to 200 degrees inclusive at a point of the high frequency switch 20.

It is preferred that the phase adjusting line 17 adjusts, with regard to the second harmonic of a frequency twice the frequency of a DCS transmission signal, the phase difference between the progressive wave and the reflected wave such that the phase difference falls within a range of 160 to 200 degrees inclusive, and adjusts, with regard to the third harmonic of a frequency three times the frequency of a DCS transmission signal, the phase difference between the progressive wave and the reflected wave such that the phase difference falls within a range of 150 to 210 degrees inclusive.

It is more preferred that the phase adjusting line 17 adjusts, with regard to the second harmonic of a frequency twice the frequency of a DCS transmission signal, the phase difference between the progressive wave and the reflected wave such that the phase difference falls within a range of 170 to 190 degrees inclusive, and adjusts, with regard to the third harmonic of a frequency three times the frequency of a DCS transmission signal, the phase difference between the progressive wave and the reflected wave such that the phase difference falls within a range of 165 to 195 degrees inclusive.

Figure 3:
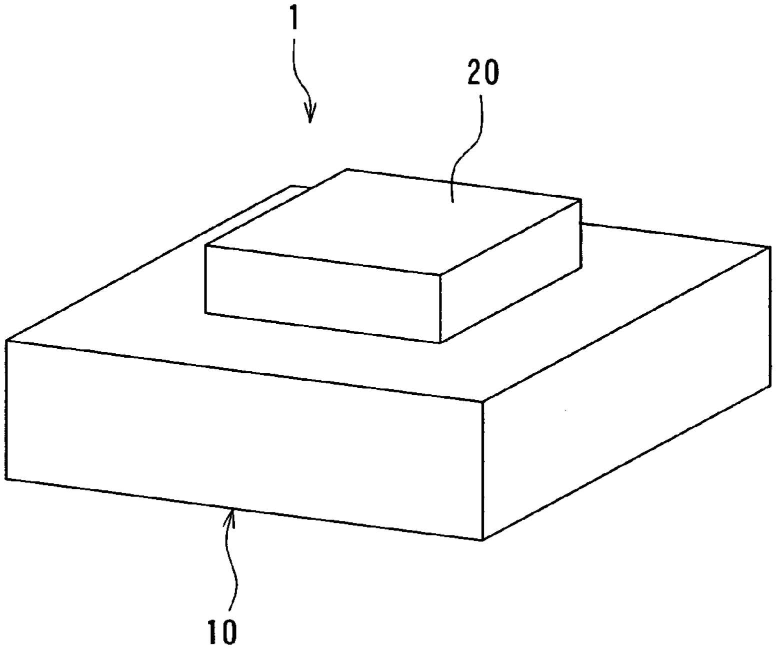
FIG. 3 is a perspective view of the appearance of the high frequency switch module of the embodiment.
Figure 4:
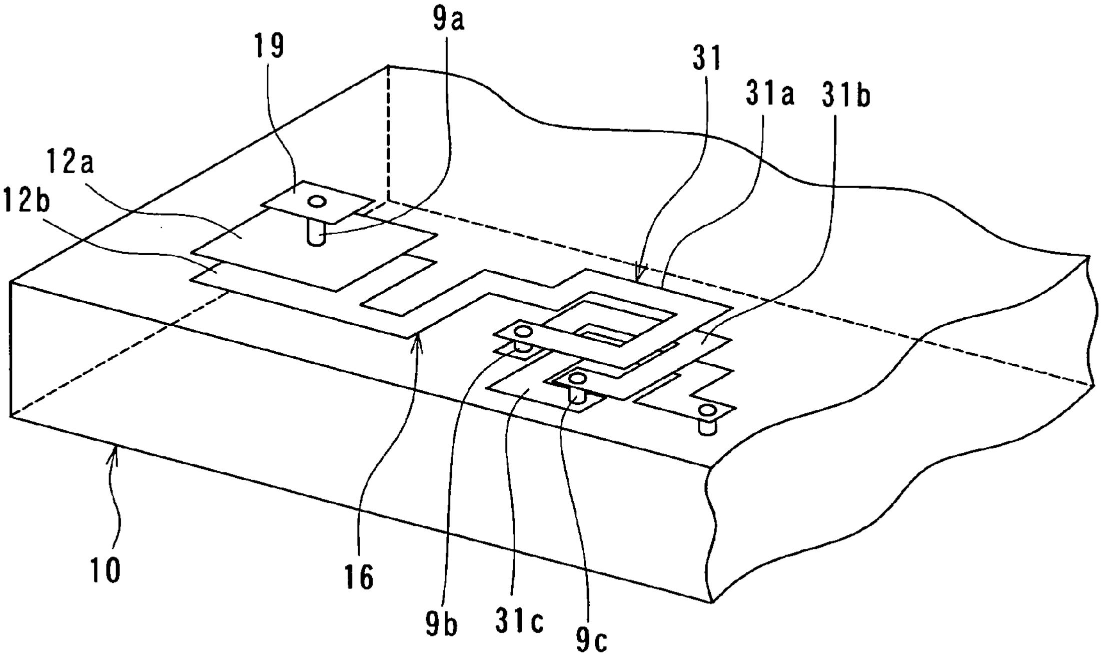
FIG. 4 is a perspective view of an example of part of the conductor layers inside the multi-layer substrate of FIG. 3.

Reference is now made to FIG. 3 and FIG. 4 to describe a multi-layer substrate for the high frequency switch module of the embodiment. FIG. 3 is a perspective view of the appearance of the high frequency switch module 1 of the embodiment. The multi-layer substrate 10 for the high frequency switch module of the embodiment has a structure in which dielectric layers and patterned conductor layers are alternately stacked. Components of the high frequency switch module 1 except the high frequency switch 20 are made up of the conductor layers located inside or on the surface of the multi-layer substrate 10. The high frequency switch 20 is mounted on the multi-layer substrate 10 as a single integrated circuit (IC). One or some of the components of the high frequency switch module 1 except the high frequency switch 20 may be mounted on the multi-layer substrate 10, too.

The multi-layer substrate 10 is a multi-layer substrate of low-temperature co-fired ceramic, for example. In this case, the multi-layer substrate 10 may be fabricated through the following steps. First, a ceramic green sheet having holes to be used as through holes is provided. On this sheet a conductor layer having a specific pattern is formed, using a conductive paste whose main ingredient is silver, for example. Next, a plurality of ceramic green sheets having such conductor layers are stacked and these are fired at the same time. The through holes are thereby formed at the same time, too. Next, terminal electrodes not shown are formed so that the multi-layer substrate 10 is completed.

FIG. 4 illustrates an example of part of the conductor layers inside the multi-layer substrate 10. In this example the capacitor 12, the phase adjusting line 16 and the inductor 31 of FIG. 1 are shown. In this example two conductor layers 12*a* and 12*b* opposed to each other make up the capacitor 12. The conductor layer 12*a* is connected through a through hole 9*a* to a conductor layer 19 located on the surface of the multi-layer substrate 10. The conductor layer 19 is designed such that the terminal connected to the contact 22*a* of the high frequency switch 20 is connected to the conductor layer 19. The inductor 31 is connected through the phase adjusting line 16 to the conductor layer 12*b*. The inductor 31 is made up of three conductor layers 31*a* to 31*c* connected to one another in series by means of through holes 9*b* and 9*c*. In this example the length of the phase adjusting line 16 is adjusted so that the phase difference between the above-mentioned progressive wave and the reflected wave is adjusted.

Figure 5:
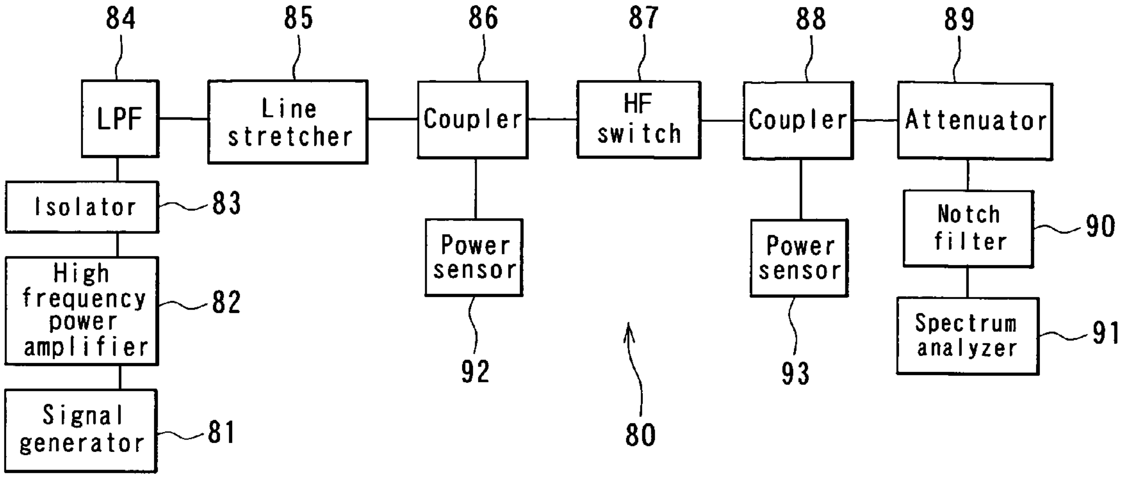
FIG. 5 is a block diagram illustrating the configuration of a measuring system used in first and second experiments performed for confirming the effect of the high frequency switch module of the embodiment.

First and second experiments will now be described. These experiments are performed to confirm that the power of frequency components of harmonics is suppressed by adjusting the length of the phase adjusting lines 16 and 17. FIG. 5 is a block diagram illustrating the configuration of a measuring system used in the first and second experiments. The measuring system 80 comprises a signal generator 81 for generating a high frequency signal serving as a transmission signal, and a high frequency power amplifier 82, an isolator 83, an LPF 84, a line stretcher 85, a coupler 86, a high frequency switch 87, a coupler 88, an attenuator 89, a notch filter 90 and a spectrum analyzer 91 that are connected one by one to stages lower than the signal generator 81. The measuring system 80 further comprises a power sensor 92 connected to the coupler 86, and a power sensor 93 connected to the coupler 88.

The high frequency power amplifier 82 amplifies a signal outputted from the signal generator 81. The isolator 83 transmits an output signal of the power amplifier 82 to the LPF 84 and blocks transmission of signals from the LPF 84 to the power amplifier 82. The LPF 84 corresponds to the LPFs 30 and 40 of FIG. 1 and allows a signal outputted from the signal generator 81 to pass and rejects harmonics thereof. The line stretcher 85 is a coaxial line capable of changing its length. The line stretcher 85 corresponds to the phase adjusting lines 16 and 17 of FIG. 1. The coupler 86 couples the high frequency switch 87 and the power sensor 92 to the line stretcher 85. The high frequency switch 87 includes a GaAs-FET and is capable of selecting a conducting or nonconducting state. The high frequency switch 87 corresponds to the high frequency switch 20 of FIG. 1. The coupler 88 couples the attenuator 89 and the power sensor 93 to the high frequency switch 87. The attenuator 89 attenuates the power of a signal passing therethrough by 20 dB. The notch filter 90 rejects frequency components of transmission signals among received signals. The spectrum analyzer 91 detects the spectrum of the signal passing through the notch filter 90. The power sensor 92 detects the power of a signal inputted to the high frequency switch 87. The power sensor 93 detects the power of a signal outputted from the high frequency switch 87.

The contents of the first and second experiments using the measuring system of FIG. 5 will now be described. The first experiment will be first described. The first experiment is performed to confirm that harmonics resulting from a GSM transmission signal are reduced by adjusting the length of the phase adjusting line 16. In the first experiment the signal generator 81 generates a signal having a frequency of 900 MHz as a GSM transmission signal. The LPF 84 is designed to allow the signal having a frequency of 900 MHz outputted from the signal generator 81 to pass and to reject harmonics thereof. The signal outputted from the signal generator 81 travels through the high frequency power amplifier 82, the isolator 83, the LPF 84, the line stretcher 85 and the coupler 86, and is received at the high frequency switch 87. The power of the signal received at the high frequency switch 87 is 34 dBm.

In the high frequency switch 87 a harmonic having a frequency ‘n’ times a frequency of 900 MHz is produced, where ‘n’ is an integer equal to or greater than 2. The progressive wave of this harmonic travels toward the coupler 86 and toward the coupler 88. The progressive wave traveling toward the coupler 86 goes through the coupler 86 and the line stretcher 85 and reaches the LPF 84. The progressive wave is nearly fully reflected off the LPF 84 and becomes a reflected wave. This reflected wave again travels through the line stretcher 85 and the coupler 86 and returns to the high frequency switch 87. As a result, a composite wave made up of the progressive wave of the harmonic and the reflected wave is produced at the high frequency switch 87 and heads for the coupler 88. The composite wave travels through the attenuator 89 and the notch filter 90 and gets detected by the spectrum analyzer 91.

Figure 6:
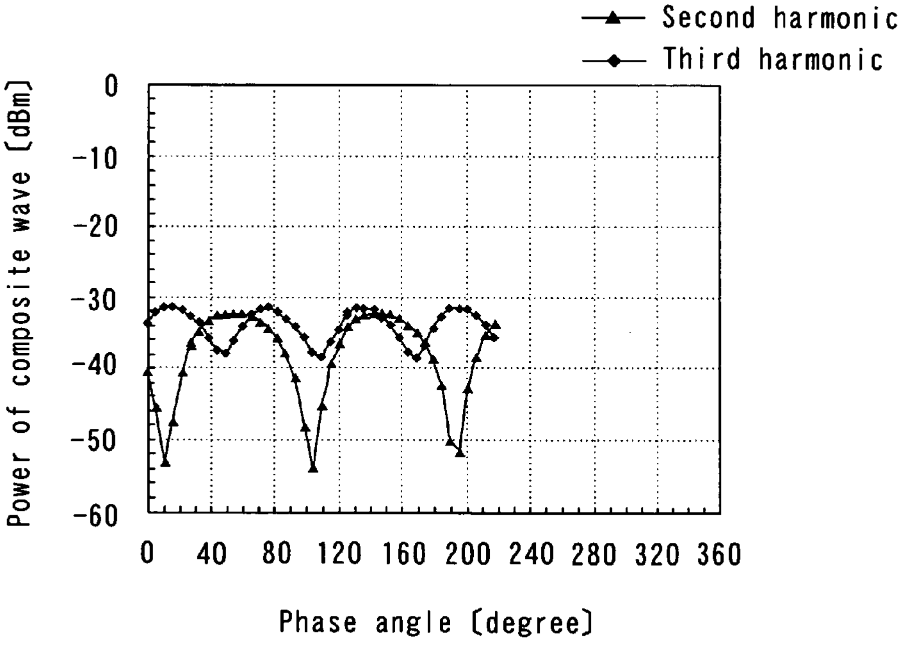
FIG. 6 is a plot showing the result of measurement of the first experiment.

According to the first experiment, the power of the composite wave with regard to the second harmonic and the power of the composite wave with regard to the third harmonic are measured while the phase difference between the progressive wave of the harmonic and the reflected wave at the point of the high frequency switch 87 is changed by changing the length of the line stretcher 85. Changing the length of the line stretcher 85 corresponds to changing the length of the phase adjusting line 16. FIG. 6 shows the result of measurement of the first experiment. The vertical axis of FIG. 6 indicates the power of the composite wave. The horizontal axis of FIG. 6 indicates the phase angle, that is, the phase difference between the phase of the composite wave obtained when the length of the line stretcher 85 is of a predetermined initial value and the phase of the composite wave obtained when the length of the line stretcher 85 is of any given value. The values of the horizontal axis of FIG. 6 are indicated by the values of phases of signals at a frequency of 900 MHz. Therefore, the phase angle of the composite wave with regard to the second harmonic is twice the value of the horizontal axis of FIG. 6. The phase angle of the composite wave with regard to the third harmonic is three times the value of the horizontal axis of FIG. 6.

In FIG. 6, when the power of the composite wave with regard to the second harmonic is of the maximum value, it is assumed that the phase difference between the progressive wave of the second harmonic and the reflected wave at the point of the high frequency switch 87 is zero. When the power of the composite wave with regard to the second harmonic is of the minimum value, it is assumed that a phase difference of 180 degrees is created between the progressive wave of the second harmonic and the reflected wave at the point of the high frequency switch 87. When the power of the composite wave with regard to the third harmonic is of the maximum value, it is assumed that the phase difference between the progressive wave of the third harmonic and the reflected wave at the point of the high frequency switch 87 is zero. When the power of the composite wave with regard to the third harmonic is of the minimum value, it is assumed that a phase difference of 180 degrees is created between the progressive wave of the third harmonic and the reflected wave at the point of the high frequency switch 87.

As shown in FIG. 6, it is noted that it is possible to make the power of the composite wave lower, with regard to each of the second and third harmonics, by changing the length of the line stretcher 85, compared to the case in which the phase difference between the progressive wave and the reflected wave is zero. Furthermore, it is possible to suppress each of the power of the composite wave with regard to the second harmonic and the power of the composite wave with regard to the third harmonic by choosing the length of the line stretcher 85 so that each of the power of the composite wave with regard to the second harmonic and the power of the composite wave with regard to the third harmonic is of the minimum value. According to the result shown in FIG. 6, each of the power of the composite wave with regard to the second harmonic and the power of the composite wave with regard to the third harmonic is nearly of the minimum value when the phase angle is approximately 100 degrees. In this case, it is assumed that a phase difference of nearly 180 degrees is created between the progressive wave of the second harmonic and the reflected wave at the point of the high frequency switch 87, and that a phase difference of nearly 180 degrees is created, too, between the progressive wave of the third harmonic and the reflected wave at the point of the high frequency switch 87. In this case, with regard to the second harmonic, the power of the composite wave is made lower by about 20 dB, compared to the case in which the phase difference between the progressive wave and the reflected wave is zero. With regard to the third harmonic, the power of the composite wave is made lower by about 8 dB, compared to the case in which the phase difference between the progressive wave and the reflected wave is zero.

As shown in FIG. 6, it is noted that, in a range of plus and minus 10 degrees of the phase angle obtained when each of the power of the composite wave with regard to the second harmonic and the power of the composite wave with regard to the third harmonic is nearly of the minimum value, it is possible that, with regard to the second harmonic, the power of the composite wave is made lower by at least 10 dB, compared to the case in which the phase difference between the progressive wave and the reflected wave is zero. In addition, in the above-mentioned range, it is possible that, with regard to the third harmonic, the power of the composite wave is made lower by at least 3 dB, compared to the case in which the phase difference between the progressive wave and the reflected wave is zero. The above-mentioned range of plus and minus 10 degrees of the phase angle is, with regard to the second harmonic, a range in which the phase difference between the progressive wave and the reflected wave is approximately 160 to 200 degrees, and with regard to the third harmonic, a range in which the phase difference between the progressive wave and the reflected wave is approximately 150 to 210 degrees.

As shown in FIG. 6, it is noted that, in a range of plus and minus 5 degrees of the phase angle obtained when each of the power of the composite wave with regard to the second harmonic and the power of the composite wave with regard to the third harmonic is nearly of the minimum value, it is possible that, with regard to the second harmonic, the power of the composite wave is made lower by at least 15 dB, compared to the case in which the phase difference between the progressive wave and the reflected wave is zero. In addition, in the above-mentioned range, it is possible that, with regard to the third harmonic, the power of the composite wave is made lower by at least 5 dB, compared to the case in which the phase difference between the progressive wave and the reflected wave is zero. The above-mentioned range of plus and minus 5 degrees of the phase angle is, with regard to the second harmonic, a range in which the phase difference between the progressive wave and the reflected wave is approximately 170 to 190 degrees, and with regard to the third harmonic, a range in which the phase difference between the progressive wave and the reflected wave is approximately 165 to 195 degrees.

As the foregoing result of the experiment shows, according to the high frequency switch module 1 of FIG. 1, it is noted that the power of frequency components of harmonics resulting from a GSM transmission signal is suppressed by adjusting the length of the phase adjusting line 16. The above-described relationship of the power of the composite wave with respect to the phase difference between the progressive wave and the reflected wave is directly applicable to the high frequency switch module 1 of FIG. 1.

The second experiment will now be described. The second experiment is performed to confirm that harmonics resulting from a DCS transmission signal are reduced by adjusting the length of the phase adjusting line 17. In the second experiment the signal generator 81 generates a signal at a frequency of 1750 MHz as a DCS transmission signal. The LPF 84 is designed to allow the signal at a frequency of 1750 MHz outputted from the signal generator 81 to pass and to reject harmonics thereof. The signal outputted from the signal generator 81 travels through the high frequency power amplifier 82, the isolator 83, the LPF 84, the line stretcher 85 and the coupler 86, and is received at the high frequency switch 87. The power of the signal received at the high frequency switch 87 is 32 dBm.

In the high frequency switch 87 a harmonic having a frequency 'n' times a frequency of 1750 MHz is produced, where 'n' is an integer equal to or greater than 2. The progressive waves of this harmonic travels toward the coupler 86 and toward the coupler 88. The progressive wave traveling toward the coupler 86 goes through the coupler 86 and the line stretcher 85 and reaches the LPF 84. The progressive wave is nearly fully reflected off the LPF 84 and becomes a reflected wave. This reflected wave again travels through the line stretcher 85 and the coupler 86 and returns to the high frequency switch 87. As a result, a composite wave made up of the progressive wave of the harmonic and the reflected wave is produced at the high frequency switch 87 and heads for the coupler 88. The composite wave travels through the attenuator 89 and the notch filter 90 and gets detected by the spectrum analyzer 91.

Figure 7:
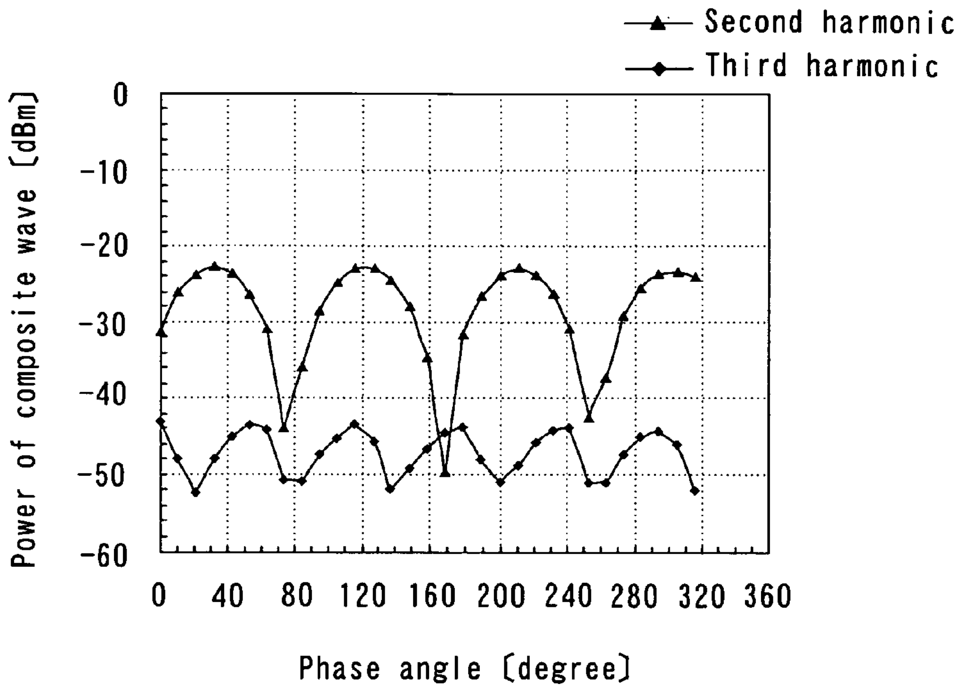
FIG. 7 is a plot showing the result of measurement of the second experiment.

In the second experiment, the power of the composite wave with regard to the second harmonic and the power of the composite wave with regard to the third harmonic are measured while the phase difference between the progressive wave of the harmonic and the reflected wave at the point of the high frequency switch 87 is changed by changing the length of the line stretcher 85. Changing the length of the line stretcher 85 is equivalent to changing the length of the phase adjusting line 17. FIG. 7 shows the result of measurement of the second experiment. The vertical axis of FIG. 7 indicates the power of the composite wave. The horizontal axis of FIG. 7 indicates the phase angle, that is, the phase difference between the phase of the composite wave obtained when the length of the line stretcher 85 is of a predetermined initial value and the phase of the composite wave obtained when the length of the line stretcher 85 is of any given value. The values of the horizontal axis of FIG. 7 are indicated by the values of phases of signals having a frequency of 1750 MHz. Therefore, the phase angle of the composite wave with regard to the second harmonic is twice the value of the horizontal axis of FIG. 7. The phase angle of the composite wave with regard to the third harmonic is three times the value of the horizontal axis of FIG. 7.

The foregoing description of the result of measurement shown in FIG. 6 is applicable to the result shown in FIG. 7, too. Therefore, as the result of FIG. 7 shows, according to the high frequency switch module 1 of FIG. 1, it is noted that the power of frequency components of harmonics resulting from a DCS transmission signal is suppressed by adjusting the length of the phase adjusting line 17.

Figure 8:
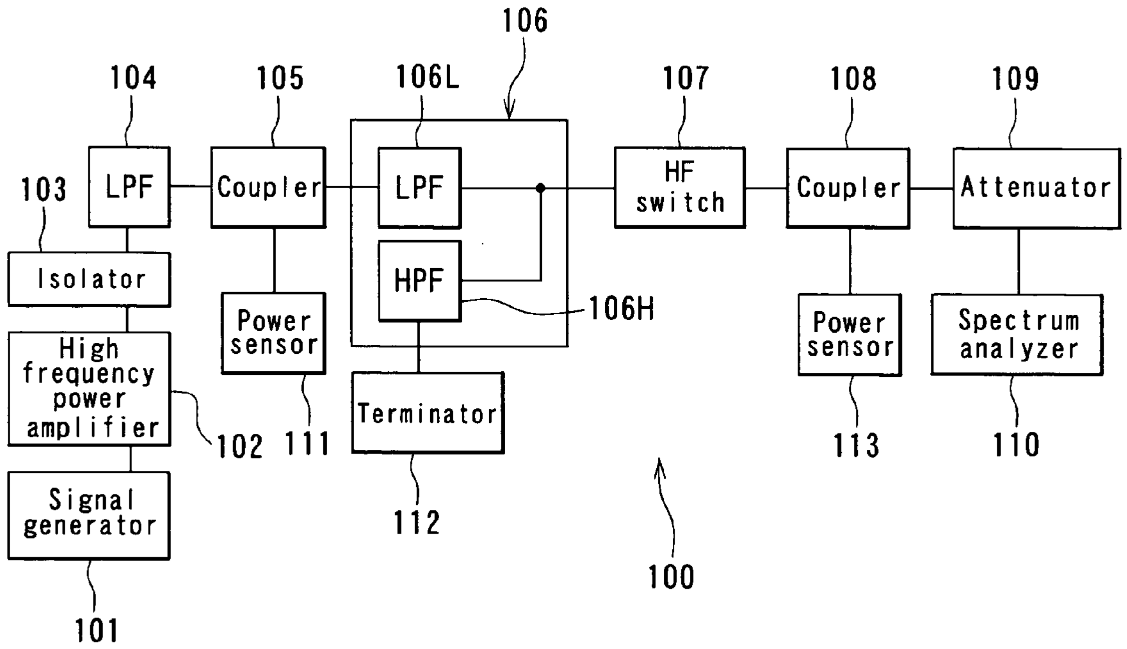
FIG. 8 is a block diagram illustrating the configuration of a measuring system used in a third experiment performed for investigating characteristics of the high frequency switch alone.

Reference is now made to FIG. 8 to describe a third experiment for investigating the characteristics of the high frequency switch 20 alone. FIG. 8 is a block diagram illustrating the configuration of a measuring system used in the third experiment. The measuring system 100 comprises a signal generator 101 for generating a high frequency signal serving as a transmission signal, and a high frequency power amplifier 102, an isolator 103, an LPF 104, a coupler 105, a duplexer 106, a high frequency switch 107, a coupler 108, an attenuator 109, and a spectrum analyzer 110 that are connected one by one to stages lower than the signal generator 101. The measuring system 100 further comprises a power sensor 111 connected to the coupler 105, a terminator 112 of 50 ohms connected to the duplexer 106, and a power sensor 113 connected to the coupler 108.

The high frequency power amplifier 102 amplifies a signal outputted from the signal generator 101. The isolator 103 transmits an output signal of the power amplifier 102 to the LPF 104 and blocks transmission of signals from the LPF 104 to the power amplifier 102. The LPF 104 corresponds to the LPFs 30 and 40 of FIG. 1 and allows a signal outputted from the signal generator 101 to pass and rejects harmonics thereof. The coupler 105 couples the duplexer 106 and the power sensor 111 to the LPF 104. The duplexer 106 incorporates an LPF 106L and a high-pass filter (hereinafter called an HPF) 106H. The LPF 106L has an end connected to the coupler 105 and the other end connected to one of the ends of the high frequency switch 107. The HPF 106H has an end connected to the terminator 112 and the other end connected to the one of the ends of the high frequency switch 107. The high frequency switch 107 includes a GaAs-FET and is capable of selecting a conducting or nonconducting state. The high frequency switch 107 corresponds to the high frequency switch 20 of FIG. 1. The coupler 108 couples the attenuator 109 and the power sensor 113 to the high frequency switch 107. The attenuator 109 attenuates the power of a signal passing therethrough by 10 dB. The spectrum analyzer 110 detects the spectrum of the signal passing through the attenuator 109. The power sensor 111 detects the power of a signal inputted to the high frequency switch 107. The power sensor 113 detects the power of a signal outputted from the high frequency switch 107.

Figure 9:
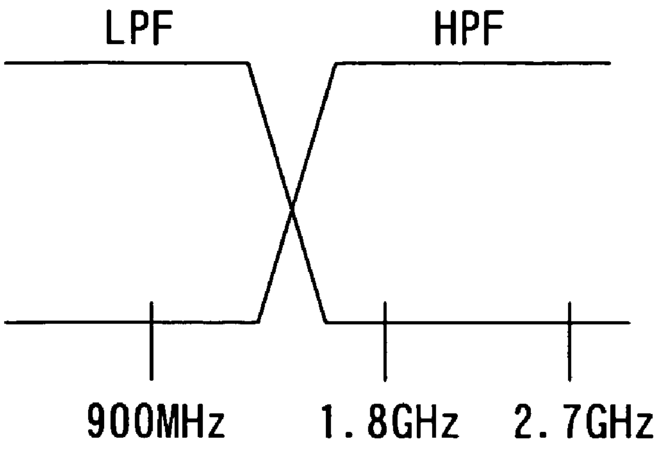
FIG. 9 illustrates the characteristics of the LPF and the HPF of the duplexer of FIG. 8 in a simplified manner.

FIG. 9 illustrates the characteristics of the LPF 106L and the HPF 106H of the duplexer 106 in a simplified manner. The LPF 106L has such characteristics that the insertion loss is 0.5 dB or smaller at a frequency of 900 MHz, the attenuation is 50 dB or greater at a frequency of 1.8 GHz, which is equal to the frequency of the second harmonic of a signal having a frequency of 900 MHz, and the attenuation is 50 dB or greater at a frequency of 2.7 GHz, which is equal to the frequency of the third harmonic of a signal having a frequency of 900 MHz. The HPF 106H has such characteristics that the attenuation is 50 dB or greater at a frequency of 900 MHz, the insertion loss is 0.5 dB or smaller at a frequency of 1.8 GHz, and the insertion loss is 0.5 dB or smaller at a frequency of 2.7 GHz.

The content of the third experiment using the measuring system of FIG. 8 will now be described. In the third experiment the signal generator 101 generates a signal having a frequency of 900 MHz as a GSM transmission signal. The signal outputted from the signal generator 101 travels through the high frequency power amplifier 102, the isolator 103, the LPF 104, the coupler 105 and the LPF 106L of the duplexer 106, and is received at the high frequency switch 107. The power of the signal received at the high frequency switch 107 is 34 dBm.

In the high frequency switch 107 a harmonic having a frequency 'n' times a frequency of 900 MHz is produced, where 'n' is an integer equal to or greater than 2. The progressive waves of this harmonic travel toward the duplexer 106 and toward the coupler 108. The progressive wave traveling toward the duplexer 106 goes through the HPF 106H of the duplexer 106, but is not reflected off the terminator 112 and will not return to the HPF 106H. The progressive wave traveling toward the coupler 108 goes through the coupler 108 and the attenuator 109, and gets detected by the spectrum analyzer 110.

Figure 10:
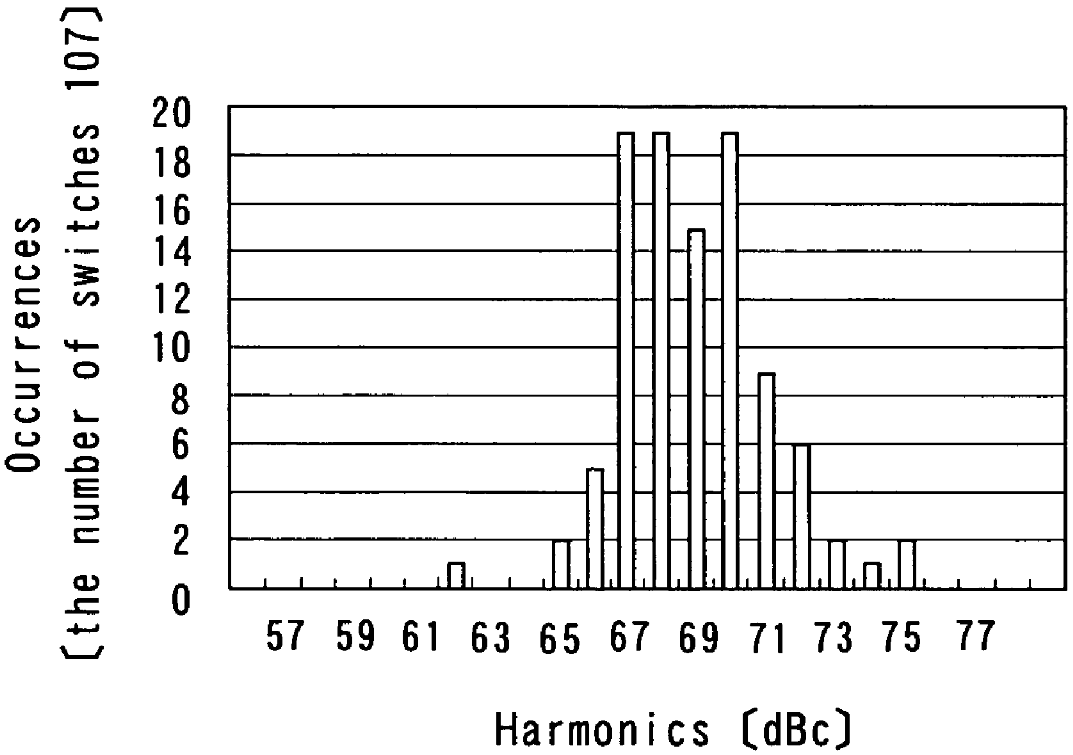
FIG. 10 is a plot showing the result of a third experiment.

As thus described, according to the third experiment, the progressive wave of the harmonic is only detected while the effect of the reflected wave of the harmonic produced by the high frequency switch 107 is removed. According to the third experiment, a plurality of high frequency switches 107 are provided and the levels of harmonics thereof are measured to determine the relationship between the levels of the harmonics and the occurrences of the harmonics (that is, the number of the high frequency switches 107). FIG. 10 shows the result thereof. The horizontal axis of FIG. 10 indicates the levels of the harmonics as carrier-to-spurious ratio (dBc). Here, the carrier is a signal having a frequency of 900 MHz and the spurious is the second harmonic of the signal having a frequency of 900 MHz. The greater the carrier-to-spurious ratio, the smaller is the level of the harmonic. The vertical axis of FIG. 10 indicates the occurrences.

The yield of the high frequency switches 107 will now be considered, referring to the result of the experiment shown in FIG. 10. According to the GSM standard, the highest value of the power of a frequency component of a harmonic at the antenna terminal is −32 dBm. In this case, if the power of the signal inputted to each of the high frequency switches 107 is 34 dBm, the lowest carrier-to-spurious ratio is 66 dBc. Since a margin of about 3 dB is typically required, the lowest carrier-to-spurious ratio with this margin is 69 dBc. According to the result shown in FIG. 10, the percentage of the high frequency switches 107 whose carrier-to-spurious ratio is 69 dBc or greater, that is, the yield, is about 50 percent.

As the result of FIG. 6 shows, according to the high frequency switch module 1 of the embodiment, it is possible that, with regard to the second harmonic of a signal having a frequency of 900 MHz, the power of composite wave is made lower by approximately 20 dB, compared to the case in which the phase difference between the progressive wave and the reflected wave is zero. As a result, it is possible that the power of a frequency component of a harmonic outputted from the antenna is made lower by approximately 10 dB, compared to the case in which the effect of the reflected wave is removed as the result of experiment shown in FIG. 10. If the power of a frequency component of a harmonic outputted from the antenna is thus made lower by approximately 10 dB, the high frequency switches 107 whose carrier-to-spurious ratio of FIG. 10 is 59 dBc or greater are usable, and the yield is nearly 100 percent.

Comparison will now be made between the high frequency switch module 1 of the embodiment and a reference high frequency switch module using a PIN diode with regard to the scale of circuits, dimensions and difficulties in designing.

Figure 11:
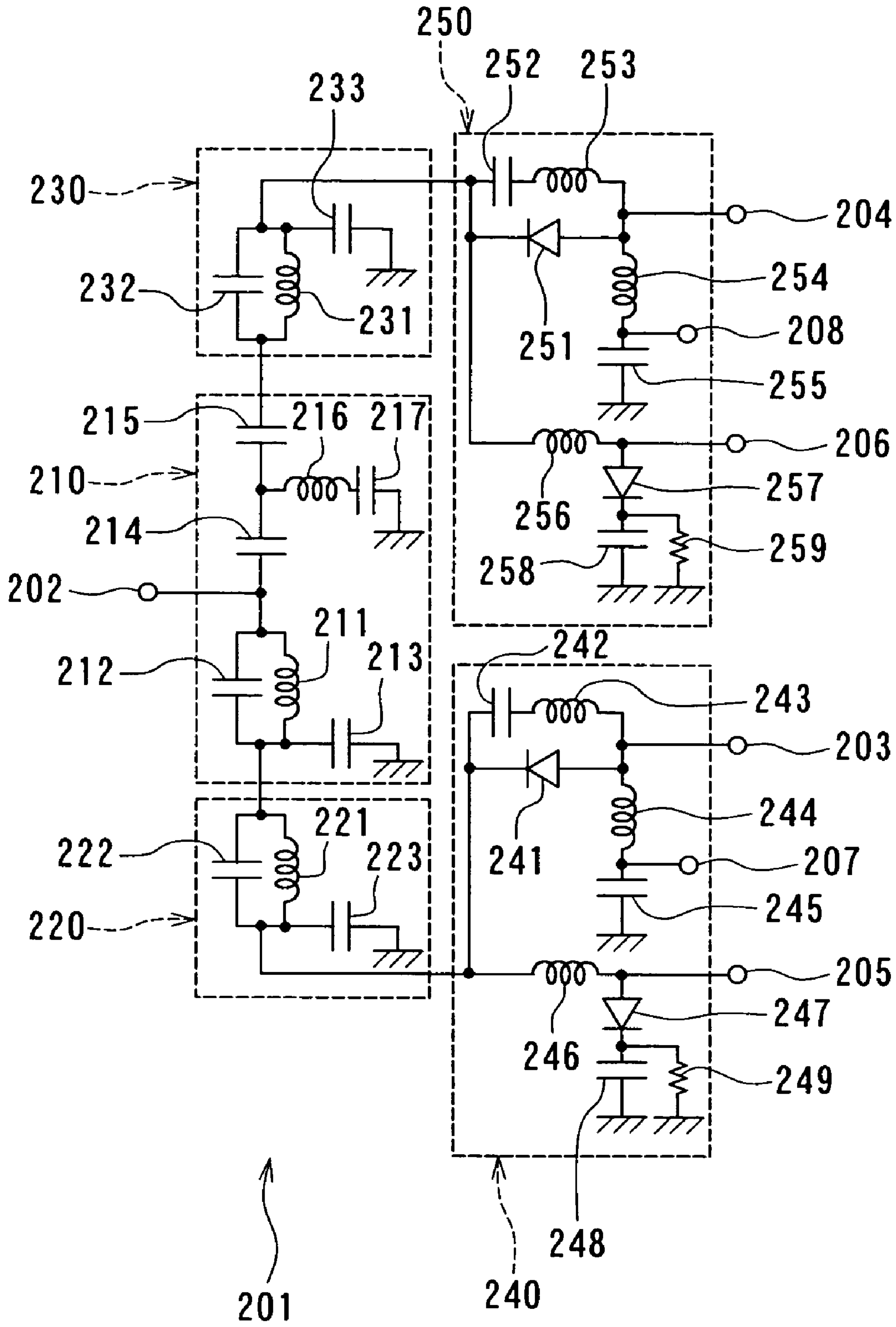
FIG. 11 is a schematic diagram illustrating the configuration of a reference high frequency switch module.

FIG. 11 is a schematic diagram illustrating the configuration of the reference high frequency switch module 201. The high frequency switch module 201 comprises an antenna port 202 connected to an antenna not shown, transmission signal ports 203 and 204, reception signal ports 205 and 206, a diplexer 210, two LPFs 220 and 230, and two switch sections 240 and 250. The transmission signal ports 203 and 204 receive GSM transmission signals and DCS transmission signals, respectively. The reception signal ports 205 and 206 receive GSM reception signals and DCS reception signals, respectively. The switch section 240 has an electronic transfer contact and selectively connects one of the transmission signal port 203 and the reception signal port 205 to this transfer contact. The switch section 250 has an electronic transfer contact and selectively connects one of the transmission signal port 204 and the reception signal port 206 to this transfer contact.

The diplexer 210 has: a first port connected to the antenna port 202; a second port for receiving and outputting GSM transmission signals and reception signals; and a third port for receiving and outputting DCS transmission signals and reception signals. The diplexer 210 further comprises: an inductor 211 having an end connected to the first port and the other end connected to the second port; a capacitor 212 having an end connected to the first port and the other end connected to the second port; and a capacitor 213 having an end connected to the second port and the other end grounded. These elements make up an LPF for allowing GSM signals to pass and intercepting DCS signals. The diplexer 210 further comprises: a capacitor 214 having an end connected to the first port; a capacitor 215 having an end connected to the other end of the capacitor 214 and the other end connected to the third port; an inductor 216 having an end connected to the other end of the capacitor 214; and a capacitor 217 having an end connected to the other end of the inductor 216 and the other end grounded. These elements make up an HPF for allowing DCS signals to pass and intercepting GSM signals.

The LPF 220 incorporates: an inductor 221 having an end connected to the second port of the diplexer 210 and the other end connected to the electronic transfer contact of the switch section 240; a capacitor 222 having an end connected to the second port of the diplexer 210 and the other end connected to the electronic transfer contact of the switch section 240; and a capacitor 223 having an end connected to the electronic transfer contact of the switch section 240 and the other end grounded.

The switch section 240 incorporates: a PIN diode 241 having a cathode connected to the electronic transfer contact and an anode connected to the transmission signal port 203; a capacitor 242 having an end connected to the electronic transfer contact; an inductor 243 having an end connected to the other end of the capacitor 242 and the other end connected to the transmission signal port 203; an inductor 244 having an end connected to the transmission signal port 203; a capacitor 245 having an end connected to the other end of the inductor 244 and the other end grounded; and a control terminal 207 connected to the node between the inductor 244 and the capacitor 245. The switch section 240 further incorporates: an inductor 246 having an end connected to the electronic transfer contact and the other end connected to the reception signal port 205; a PIN diode 247 having an anode connected to the reception signal port 205; a capacitor 248 having an end connected to a cathode of the PIN diode 247 and the other end grounded; and a resistor 249 having an end connected to the cathode of the PIN diode 247 and the other end grounded.

The LPF 230 incorporates: an inductor 231 having an end connected to the third port of the diplexer 210 and the other end connected to the electronic transfer contact of the switch section 250; a capacitor 232 having an end connected to the third port of the diplexer 210 and the other end connected to the electronic transfer contact of the switch section 250; and a capacitor 233 having an end connected to the electronic transfer contact of the switch section 250 and the other end grounded.

The switch section 250 incorporates: a PIN diode 251 having a cathode connected to the electronic transfer contact and an anode connected to the transmission signal port 204; a capacitor 252 having an end connected to the electronic transfer contact; an inductor 253 having an end connected to the other end of the capacitor 252 and the other end connected to the transmission signal port 204; an inductor 254 having an end connected to the transmission signal port 204; a capacitor 255 having an end connected to the other end of the inductor 254 and the other end grounded; and a control terminal 208 connected to the node between the inductor 254 and the capacitor 255. The switch section 250 further incorporates: an inductor 256 having an end connected to the electronic transfer contact and the other end connected to the reception signal port 206; a PIN diode 257 having an anode connected to the reception signal port 206; a capacitor 258 having an end connected to a cathode of the PIN diode 257 and the other end grounded; and a resistor 259 having an end connected to the cathode of the PIN diode 257 and the other end grounded.

In the high frequency switch module 201, when the control signal applied to the control terminal 207 is high, the diodes 241 and 247 are conducting, and the transmission signal port 203 is connected to the antenna port 202 through the LPF 220 and the diplexer 210. When the control signal applied to the control terminal 207 is low, the diodes 241 and 247 are nonconducting, and the reception signal port 205 is connected to the antenna port 202 through the LPF 220 and the diplexer 210. When the control signal applied to the control terminal 208 is high, the diodes 251 and 257 are conducting, and the transmission signal port 204 is connected to the antenna port 202 through the LPF 230 and the diplexer 210. When the control signal applied to the control terminal 208 is low, the diodes 251 and 257 are nonconducting, and the reception signal port 206 is connected to the antenna port 202 through the LPF 230 and the diplexer 210.

The reference high frequency switch module 201 incorporates the thirty-one elements. About twenty-three of these elements, for example, are formed in the multi-layer substrate. In contrast, the high frequency switch module 1 of the embodiment of the invention incorporates the seventeen elements. About eleven of these elements, for example, are formed in the multi-layer substrate. As thus described, the reference high frequency switch module 201 has the circuit that is more complicated than the circuit of the high frequency switch module 1 of the embodiment, which makes it difficult to design and to reduce the dimensions. In particular, the reference high frequency switch module 201 incorporates more inductors and capacitors, compared to the high frequency switch module 1 of the embodiment. Consequently, the reference high frequency switch module 201 is likely to induce coupling of the inductors to each other and stray capacitance, which requires a number of prototypes to make until desired characteristics are obtained. As a result, an increase in costs for development and a delay in introducing the products to the market will result. In contrast, the high frequency switch module 1 of the embodiment has a simple configuration and is easy to design. Therefore, according to the high frequency switch module 1 of the embodiment, the period of time required for development may be about a half the period required for developing the reference high frequency switch module 201.

Furthermore, according to the high frequency switch module 1 of the embodiment, the input impedance and the output impedance of the high frequency switch 20 in a form of IC are matched to be 50 ohms in a broad band. This also makes it easy to design the high frequency switch module 1.

The high frequency switch module 1 of the embodiment incorporates a small number of elements. In addition, the high frequency switch 20 using the GaAs-FET has a chip size of about 1 millimeter in length and about 1 millimeter in width. It is therefore easy to reduce the dimensions of the high frequency switch module 1 of the embodiment.

While the power consumption of a switch having a PIN diode is about 10 mA, the power consumption of a switch having a GaAs-FET is only 10 μA or smaller. It is therefore possible that the high frequency switch module 1 of the embodiment consumes power lower than the reference high frequency switch module 201.

A GaAs-FET produces harmonics when a transmission signal of large power passes therethrough. However, as described in detail above, it is possible to suppress the power of frequency components of harmonics sent out from the antenna, according to the high frequency switch module 1 of the embodiment.

According to the high frequency switch module 1 of the embodiment, the inductor 18 as a surge suppressing element is provided, so that the high frequency switch 20 is prevented from being damaged by a surge. The surge suppressing element may be any other element such as a varistor, a Zener diode or a transient voltage suppressor.

The present invention is not limited to the foregoing embodiment but may be practiced in still other ways. For example, the high frequency switch is not limited to the one including a GaAs-FET as a semiconductor switch element but may include any other type of semiconductor switch element.

The combination of frequency bands of the embodiment is given by way of example and the invention may be applied to a combination of other frequency bands.

According to the high frequency switch module and the multi-layer substrate for the high frequency switch module of the invention as thus described, the high frequency switch module having a simple configuration, easy to design, and capable of suppressing the power of frequency components of harmonics is achieved.

Obviously many modifications and variations of the present invention are possible in the light of the above teachings. It is therefore to be understood that within the scope of the appended claims the invention may be practiced otherwise than as specifically described.

What is claimed is:

1. A high frequency switch module comprising:

an antenna port connected to an antenna;

a plurality of transmission signal ports for receiving transmission signals at each of a plurality of frequency bands;

a plurality of reception signal ports for outputting reception signals at each of a plurality of frequency bands;

a high frequency switch including a semiconductor switch element and selectively connecting one signal port among the transmission signal ports and the reception signal ports to the antenna port;

a plurality of low-pass filters each provided between the high frequency switch and each of the transmission signal ports and allowing a transmission signal inputted to each of the transmission signal ports to pass therethrough and intercepting a harmonic resulting from the transmission signal; and a plurality of phase adjusting lines for connecting the high frequency switch to the respective low-pass filters, wherein each of the phase adjusting lines adjusts a phase difference between a progressive wave of a harmonic of at least one frequency resulting from the transmission signal and produced at the high frequency switch and a reflected wave resulting from reflection of the progressive wave from one of the low-pass filters such that, at a point of the high frequency switch, a composite wave made up of the progressive wave and the reflected wave has power lower by at least 10 dB as compared to a case where the phase difference between the progressive wave and the reflected wave is zero.

2. The high frequency switch module according to claim 1, wherein each of the phase adjusting lines adjusts, with regard to a second harmonic, a phase difference between the progressive wave and the reflected wave such that the composite wave has power lower by at least 10 dB as compared to the case where the phase difference between the progressive wave and the reflected wave is zero, and adjusts, with regard to a third harmonic, a phase difference between the progressive wave and the reflected wave such that the composite wave has power lower by at least 3 dB as compared to the case where the phase difference between the progressive wave and the reflected wave is zero.

3. The high frequency switch module according to claim 1, wherein each of the phase adjusting lines adjusts, with regard to a second harmonic, a phase difference between the progressive wave and the reflected wave such that the composite wave has power lower by at least 15 dB as compared to the case where the phase difference between the progressive wave and the reflected wave is zero, and adjusts, with regard to a third harmonic, a phase difference between the progressive wave and the reflected wave such that the composite wave has power lower by at least 5 dB as compared to the case where the phase difference between the progressive wave and the reflected wave is zero.

4. The high frequency switch module according to claim 1, wherein each of the phase adjusting lines includes a distributed constant line.

5. The high frequency switch module according to claim 1, wherein the high frequency switch includes a transistor as the semiconductor switch element.

6. The high frequency switch module according to claim 5, wherein the transistor is a field-effect transistor made of a GaAs compound semiconductor.

7. A high frequency switch module comprising:

an antenna port connected to an antenna;

a plurality of transmission signal ports for receiving transmission signals at each of a plurality of frequency bands;

a plurality of reception signal ports for outputting reception signals at each of a plurality of frequency bands;

a high frequency switch including a semiconductor switch element and selectively connecting one signal port among the transmission signal ports and the reception signal ports to the antenna port;

a plurality of low-pass filters each provided between the high frequency switch and each of the transmission signal ports and allowing a transmission signal inputted to each of the transmission signal ports to pass therethrough and intercepting a harmonic resulting from the transmission signal; and a plurality of phase adjusting lines for connecting the high frequency switch to the respective low-pass filters, wherein each of the phase adjusting lines adjusts a phase difference between a progressive wave of a harmonic of at least one frequency resulting from the transmission signal and produced at the high frequency switch and a reflected wave resulting from reflection of the progressive wave from one of the low-pass filters such that the phase difference falls within a range of 160 to 200 degrees inclusive at a point of the high frequency switch.

8. The high frequency switch module according to claim 7, wherein each of the phase adjusting lines adjusts, with regard to a second harmonic, a phase difference between the progressive wave and the reflected wave such that the phase difference falls within a range of 160 to 200 degrees inclusive, and adjusts, with regard to a third harmonic, a phase difference between the progressive wave and the reflected wave such that the phase difference falls within a range of 150 to 210 degrees inclusive.

9. The high frequency switch module according to claim 7, wherein each of the phase adjusting lines adjusts, with regard to a second harmonic, a phase difference between the progressive wave and the reflected wave such that the phase difference falls within a range of 170 to 190 degrees inclusive, and adjusts, with regard to a third harmonic, a phase difference between the progressive wave and the reflected wave such that the phase difference falls within a range of 165 to 195 degrees inclusive.

10. The high frequency switch module according to claim 7, wherein each of the phase adjusting lines includes a distributed constant line.

11. The high frequency switch module according to claim 7, wherein the high frequency switch includes a transistor as the semiconductor switch element.

12. The high frequency switch module according to claim 11, wherein the transistor is a field-effect transistor made of a GaAs compound semiconductor.

13. A multi-layer substrate used for a high frequency switch module, the high frequency switch module comprising:

an antenna port connected to an antenna;

a plurality of transmission signal ports for receiving transmission signals at each of a plurality of frequency bands;

a plurality of reception signal ports for outputting reception signals at each of a plurality of frequency bands;

a high frequency switch including a semiconductor switch element and selectively connecting one signal port among the transmission signal ports and the reception signal ports to the antenna port;

a plurality of low-pass filters each provided between the high frequency switch and each of the transmission signal ports and allowing a transmission signal inputted to each of the transmission signal ports to pass therethrough and intercepting a harmonic resulting from the transmission signal; and a plurality of phase adjusting lines for connecting the high frequency switch to the respective low-pass filters, wherein:

each of the phase adjusting lines adjusts a phase difference between a progressive wave of a harmonic of at least one frequency resulting from the transmission signal and produced at the high frequency switch and a reflected wave resulting from reflection of the progressive wave from one of the low-pass filters such that, at a point of the high frequency switch, a composite wave made up of the progressive wave and the reflected wave has power lower by at least 10 dB as compared to a case where the phase difference between the progressive wave and the reflected wave is zero; and the multi-layer substrate includes the antenna port, the transmission signal ports, the reception signal ports, the low-pass filters and the phase adjusting lines, and is used to complete the high frequency switch module by mounting the high frequency switch thereon.

14. A multi-layer substrate used for a high frequency switch module, the high frequency switch module comprising:

an antenna port connected to an antenna;

a plurality of transmission signal ports for receiving transmission signals at each of a plurality of frequency bands;

a plurality of reception signal ports for outputting reception signals at each of a plurality of frequency bands;

a high frequency switch including a semiconductor switch element and selectively connecting one signal port among the transmission signal ports and the reception signal ports to the antenna port;

a plurality of low-pass filters each provided between the high frequency switch and each of the transmission signal ports and allowing a transmission signal inputted to each of the transmission signal ports to pass therethrough and intercepting a harmonic resulting from the transmission signal; and a plurality of phase adjusting lines for connecting the high frequency switch to the respective low-pass filters, wherein:

each of the phase adjusting lines adjusts a phase difference between a progressive wave of a harmonic of at least one frequency resulting from the transmission signal and produced at the high frequency switch and a reflected wave resulting from reflection of the progressive wave from one of the low-pass filters such that the phase difference falls within a range of 160 to 200 degrees inclusive at a point of the high frequency switch; and the multi-layer substrate includes the antenna port, the transmission signal ports, the reception signal ports, the low-pass filters and the phase adjusting lines, and is used to complete the high frequency switch module by mounting the high frequency switch thereon.

* * * * *